Feb. 18, 1969   R. F. NOWOSADKO   3,427,707
METHOD OF JOINING A PIPE AND FITTING
Filed Dec. 16, 1965
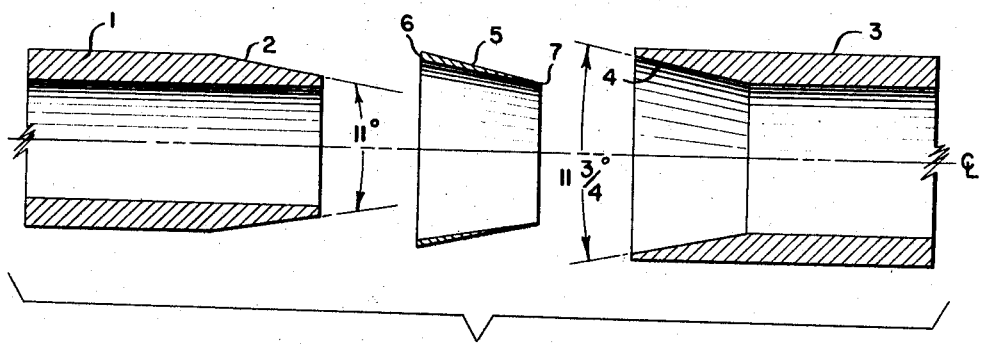
FIG. 1
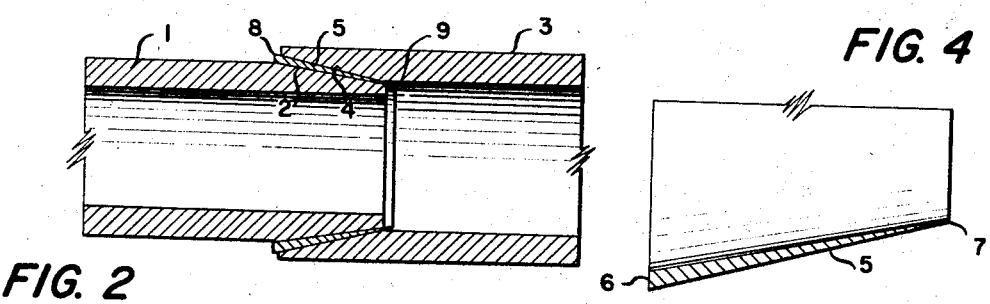
FIG. 2
FIG. 4
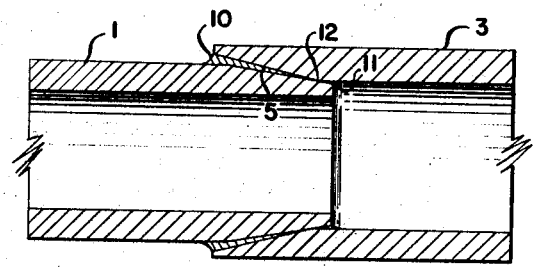
FIG. 3
FIG. 5
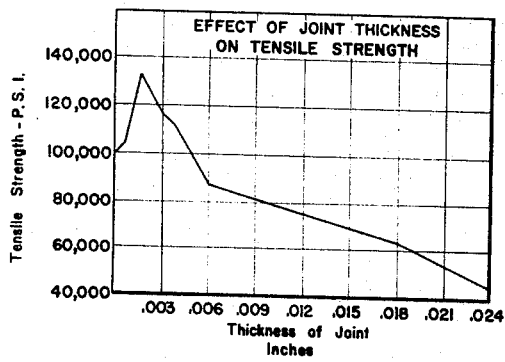
INVENTOR
RAYMOND F. NOWOSADKO
BY Edmund M. Jaskiewicz
ATTORNEY United States Patent Office 3,427,707
Patented Feb. 18, 1969

3,427,707
METHOD OF JOINING A PIPE AND FITTING
Raymond F. Nowosadko, Norwich, Conn., assignor to The Connecticut Research & Manufacturing Corporation, Norwich, Conn., a corporation of Connecticut
Filed Dec. 16, 1965, Ser. No. 514,244
U.S. Cl. 29—482          7 Claims
Int. Cl. B23k 31/02, 1/20; F16l 13/08

ABSTRACT OF THE DISCLOSURE

A method of joining a pipe and fitting wherein the external surface of a pipe end is tapered and the internal surface of a fitting end is tapered to a greater angle with respect to the longitudinal axis of the pipe end fitting. The tapered pipe and fitting ends are assembled with a pre-formed tapered sleeve of solder material positioned between the respective tapered surfaces. Upon heating the assembled joint an axial force is applied to the pipe and fitting so that the tapered end of the pipe comes into line contact with the tapered fitting end and the solder forms a bond therebetween.

---

The present invention relates to a process for soldering or brazing a pipe to a fitting wherein the tapered end of the pipe is received within a tapered opening of the fitting with the fitting taper being at a slightly greater angle than the tapered end of the pipe so that a line contact is formed between the tapered surfaces and a solder material is disposed between the tapered surfaces.

One form of joint which is commonly used in soldering or brazing a pipe to a fitting includes the step of forming a seat within one end of the fitting of such a diameter to closely receive the end of the pipe. A peripheral groove is then formed in the inner peripheral surface of the fitting seat and a ring of solder alloy inserted therein. The end of the pipe is then introduced into the fitting opening and the assembled pipe and fitting heated to cause the molten solder alloy to be drawn between the fitting and pipe surfaces by capillary action to form the joint.

While adequate for many purposes, this joint is generally unsatisfactory since the strength of the joint depends upon very accurate tolerances between the pipe and fitting, which are difficult to achieve, and cleanliness of the joined surfaces, which is also difficult to attain. Further, a difficult manufacturing operation is involved in forming the peripheral groove within the fitting. It is also difficult to properly clean the fitting surface and then insert the ring of solder alloy into the groove without touching either the ring or the cleaned fitting surface with the hands. Also, many such joints do not have full adhesion between the joined surfaces since the molten solder does not completely fill the space between the pipe and fitting. Generally speaking, an average of about 30 percent of the joined pipe and fitting surfaces are bonded together with the alloy. In addition, some of the alloy becomes trapped within the groove and is not at all utilized in the bonding process.

Another difficulty is encountered when inserting the pipe into the fitting, particularly for larger diameter pipe such as 6 inches in diameter. Because the mating surfaces of the pipe and fitting are parallel, the end of the pipe must be accurately introduced into the fitting. In the case of heavy, large diameter pipe this becomes a most difficult task.

Other forms of soldered pipe joints have been devised wherein a tapered end of a pipe is fitted into a correspondingly tapered fitting. However, the angles of taper of both the pipe and the fitting are equal and the thickness of the film of solder bonding the tapered surfaces is intended to be uniform. This result has been difficult to achieve in practice, since it becomes almost impossible to center accurately a pipe within a fitting at the proper position within the fitting so that a uniform thickness of solder will be obtained between the tapered surfaces. This difficulty is greatly magnified in the case of large diameter pipes. It is therefore difficult to obtain joints of uniform strength since the pipe must be precisely and accurately positioned within the fitting.

A further disadvantage of such tapered joints is that when the solder between the tapered surfaces becomes molten, some of the solder will flow into the interior of the pipe. Thus, after pipes are joined in this manner steps must be taken to thoroughly clean the interior of the piping of any solder and flux which has flowed therein. Such cleaning procedures are time-consuming and expensive particularly when the piping is to be used for high pressure hydraulic lines to actuate controls.

It is therefore the principal object of the present invention to provide a novel and improved method of fabrication of a soldered pipe joint.

It is another object of the present invention to provide a process for soldering a pipe to a fitting wherein uniform high-strength joints are consistently obtained with a minimum of time and effort.

It is a further object of the present invention to provide a soldered joint for pipes and fittings which is easily fabricated and which provides positive control of cleanliness and surface roughness during the preparation of the joint.

The joint of the present invention is particularly adapted to the brazing together of stainless steel pipes and fittings with a silver alloy, but may be also used for soldering or brazing pipes of other materials. In fabricating the joint of the present invention, the male or pipe end of a joint is machined to a taper of about 11 degrees. The fitting or female end of the joint is machined to a taper of about 11¾ degrees by the use of an inside borer or reamer. By the use of power-driven reamers for both the male and female ends of the joint, the pure parent metal surface is exposed and the highest possible degree of cleanliness is thus achieved quickly and simply.

An insert comprising a thin-walled tapered tubular member of solder material having a circular cross-section is then positioned over the tapered end of the pipe or within the tapered fitting end. The thickness of the wall of the insert deccreases from the larger diameter end from a thickness of about 0.005 inch to a fine edge or 0.000 inch.

The pipe with the insert thereon is then introduced into the fitting. Because of the difference in the taper angles of the pipe and the fitting, a positive stop is provided for the introduction of the pipe into the fitting when the tapered surfaces of the pipe, fitting and solder material engage each. Because of the tapered surfaces of the pipe and fitting, and the insert, the pipe thus automatically centered within the fitting. The fitted joint is then heated and the alloy is liquified. A positive pressure is constantly maintained on the far end of the pipe and the fitting and as a result the heated joint is squeezed. This assists the alloy in becoming bonded to the clean pipe and fitting surfaces. Also, this urging together of the pipe and fitting results in a line contact between the pipe and fitting tapered surfaces because of the difference in the angles of taper of these surfaces.

The line contact between the tapered surfaces forms a seal to the interior of the pipe and, accordingly, the flux, gases and excess liquid alloy flow only outwardly to the exterior of the bonded joint and not into the pipe itself.

Where maximum quality assurance of a full bond is desired, or where internal pipe cleanliness is mandatory, each joint suface (i.e. pipe and fitting) can be pretinned. The joint can then be assembled and heat and flux applied to achieve the desired bond as described above. Under certain conditions additional silver solder can be "face fed" into the joint.

The finished joint has great strength since the tapered clearance between the mating pipe and fitting surfaces causes the strength parameter to lie in the highest tensile strength region of the tensile strength v. clearance curve. Further, due to the wedge-shaped cross-section of the tapered annular space, voids in the bonded area are eliminated because the liquified flux and gases are induced to flow outwardly to the exterior of the bonded joint and not into the pipe.

Other objects and advantages of the present invention will be apparent from the accompanying description when taken in conjunction with the following drawings wherein:

FIGURE 1 is an exploded longitudinal sectional view of the pipe, alloy insert and fitting according to the present invention prior to assembly;

FIGURE 2 is a longitudinal sectional view showing the pipe, alloy insert and fitting of the present invention in assembled relationship;

FIGURE 3 is a longitudinal sectional view of the joint formed between the pipe and fitting according to the present invention;

FIGURE 4 is a half-sectional view in enlarged scale of the alloy insert to illustrate the wedge shape of the insert wall; and FIGURE 5 is a curve showing the effect of joint thickness on tensile strength of a brazed joint between stainless steel members.

The process of the present invention and the joint formed by this process shall next be described in detail by referring to the drawings wherein like reference symbols indicate the same parts throughout the various views.

In carrying out the process of the present invention, the male or pipe end 1 of the joint, is machined to a taper of 11 degrees at 2 using only an outside borer or reamer ground to the proper taper. No guages or other highly accurate measuring instruments are involved. The entire operation of preparing the pipe end of the joint is completed in one step. Since the length of the taper is not critical for purposes of quality as well as strength and reliability of the joint, rigid and close tolerance specifications are not necessary. It is pointed out that pipe is seldom prefectly round, usually being slightly elliptical. In order to form the known joint as described above the pipe end must be first "rounded" and on many occasions the pipe end must be "expanded" (by using special tools) to achieve the very close tolerances required in the space between the pipe and the fitting. It is frequently necessary to repeat the process of rounding and/or expanding several times before achieving the required close tolerance between the pipe and the fitting. However, according to the present invention, only one quick machining operation is required to obtain the necessary taper on the pipe end and the accuracy of this process need merely be that which can be achieved with an ordinary ruler without requiring any micrometers or feeler gauges.

The female or fitting end 3 of the joint is then machined to a taper of 11¾ degrees at 4 using only an inside borer or reamer ground to the proper taper. Again, the preparation of the fitting end of the joint is performed in one manufacturing operation and the accuracy of this step can be achieved readily with an ordinary ruler.

Included angles of 11 degrees and 11¾ degrees, as described above, offer a specific embodiment of the full bond tapered joint of the present invention. The pipe joint of the present invention will be equally effective within the taper range of from 4 degrees to 20 degrees. Generally speaking, taper angles ranging from 4 degrees to 9 degrees are better suited for higher strength application and taper angles in the 12 degree to 20 degree range will be better suited for lower strength application. In all cases the taper angles between the pipe and the fitting must be such that the radial cavity clearance between the pipe and fitting ranges from line contact at 0.000 inch to about 0.005 inch.

For a high pressure system reducing the angle of the tapered joint from 11 degrees to about 7 degrees would result in increasing the length of the joint about 30 percent or more. The reduced taper angle together with a longer tapered joint would result in a greatly increased bonded surface which in turn would considerably increase the overall strength of the joint. In a like manner, for very low pressure systems, the angle of the tapered joint could be increased to about 15 degrees and the length of the tapered joint would be correspondingly decreased. Thus less joint strength could be provided to a piping system where great strength is not required and further additional savings in labor materials and costs would accrue.

An insert 5 of a suitable solder or brazing alloy is positioned between the tapered surfaces 2 and 4. The insert 5 comprises a thin-walled tapered tubular member having a circular cross-section with the cross-section of the wall of the member being wedge-shaped as illustrated in FIGURE 4. The thickness of the wall of the tubular member decreases from about 0.005 inch at the larger diameter end 6 to a thin edge of 0.000 inch at the smaller diameter end 7. The shape of this tubular member enables the alloy insert to fit snugly and precisely into the cavity between the tapered surfaces 2 and 4 of the pipe end fitting.

The composition of the alloy will depend upon the material combination of the pipe and fitting. A number of different solder and brazing alloys are known to be suitable for joining particular materials. By way of example, for joining a pipe of stainless steel to a stainless steel fitting, the composition of the brazing alloy would be, for example, silver—49.0 to 51.0 percent; copper—14.5 to 16.5 percent; zinc—13.5 to 17.5 percent; cadmium—15.0 to 17.0 percent; nickel—2.5 to 3.5 percent.

In order to attain a satisfactory soldering bond the surfaces to be silver soldered must be properly cleaned in order that the surfaces being joined are wet by and alloyed with the brazing or soldering alloy to the highest degree. The entire cleaning operation necessary for fabricating the joint of the present invention may be readily accomplished without human hands touching the surfaces to be silver soldered. As a result, when the joint is ready to be soldered it is in a surgically as well as a chemically clean condition. As described above, the use of power driven reamers for both the pipe and fitting ends of the joint exposed pure parent metal surface to result in the highest possible degree of cleanliness. The solder alloy insert as described above may be pre-packaged in a sealed plastic container and kept in this container until ready for use. As a result, the alloy insert will be kept clean and can be inserted into position in the joint using a suitable tool, such as pliers. Since the tubular insert can be readily positioned over the tapered pipe end 2 with pliers or a similar tool, and since the pipe end can be readily inserted into the tapered fitting end 4 without the necessity for touching either the pipe or fitting tapered surfaces, it is thus apparent that none of the surgically clean surfaces which are to be soldered are touched by bare hands. The simplicity of the cleaning operation enables the entire cleaning process to be carried out with equal ease in the laboratory, in the shop or in the field. Further, the cleaning of the tapered surfaces by reamer assures near-perfect roundness of the joint and, accordingly, the highest possible quality assurance of joint geometry is obtained.

The fitup or insertion of the pipe end into the fitting is next carried out. The fitup is quickly and easily carried out because the tapered surfaces of the fitting and pipe work in favor of the person carrying out the operation. At the beginning of the insertion, the worker has a considerably greater latitude than with the fitup of pipes and fittings to form a non-tapered or parallel surface joint. It is apparent that with joints where the pipe end and fitting end are parallel, the initial clearance will range only from 0.000 inch to about 0.005 inch as compared to an initial insertion clearance of about ⅛ inch for the present invention. The ease of fitup of a pipe and fitting according to the present invention becomes of considerable importance with larger and heavier pipe sizes, since with known non-parallel joint structures a close tolerance must still be maintained. Accordingly, insertion of the pipe into the fitting becomes increasingly difficult as the pipe size increases. This is in direct contrast to fitup with the present invention wherein fitup becomes easier since the tapered surfaces provide a considerably greater initial clearance between the pipe and fitting.

The rounding and expanding procedure as described above is eliminated from the present invention because the pipe and fitting are reamed to true roundness and the desired cavity clearance of 0.000 inch to about 0.005 inch is automatically obtained upon the insertion of the pipe within the fitting.

The tapered surfaces of the pipe and fitting of the present invention control the cavity configuration so accurately that no measurement of the cavity is necessary with feeler gauges or micrometers.

Because of the simple construction of the present tapered joint, highly skilled pipe fitters are not required to achieve joints which will have the requisite high quality.

The alloy member 5 is so constructed that slight excesses of alloy 8 and 9 are provided at each end of the joint when fitup is completed. As a result, the tapered surfaces which are to be bonded are provided with 100 percent alloy coverage plus a slight excess of alloy at each end of the joint. This slight excess of alloy 8 and 9 enables the formation of concave fillets 10 and 11 at each end of the bonded joint as may be seen in FIGURE 3. In effect, a bond slightly more than 100 percent is obtained.

After fitup is completed the fitted joint is heated, generally from the exterior, in a known manner and the solder alloy insert 5 begins to liquify. A force is constantly maintained on the far end of the pipe and the fitting to urge the pipe and fitting against each other and to cause the heated joint to be squeezed. When the solder becomes liquid, the extreme end of the pipe 1 engages the tapered surface 4 of the fitting at 12, as shown in FIGURE 3 to form a line contact seal in the joint. Thus, except for the small quantity of deliberate alloy excess 9 all flux, gases and excess solder are flashed to the exterior of the joint and not into the interior of the pipe. As a result the lumen of the pipe is maintained in clean condition to eliminate any possibility of contamination of fluid which will flow through the pipe system. It is apparent that a clean pipe system eliminates the possibility of damage to various moving components such as pumps, valves, actuators and other like mechanisms. Upon the hardening of the liquified solder, a joint is formed as illustrated in FIGURE 3 with the concave solder fillets 10 and 11 at each end of the joint. As described previously, the interior concave fillet 11 is formed from the slight surface of alloy 9 provided as shown in FIGURE 2.

The thickness of the bond formed by the solder within the joint varies from 0.000 inch at the line contact seal 12 to approximately 0.005 inch at the exterior of the joint at the outer edge of the fitting 3. Thus, the strength parameter of this joint falls in the highest tensile strength region of the tensile strength versus thickness of joint curve, illustrated in FIGURE 5. The curve of FIGURE 5 shows the effect of joint thickness on tensile strength obtained from joints of stainless steel having an "as received" tensile strength of 160,000 pounds per square inch. From the curve it is apparent that the maximum tensile strength of the joint is obtained when the joint thickness is about 0.0015 inch. The strength of the joint then proceeds to decrease as the thickness of the joint is increased. By providing that the thickness of the joint disclosed herein ranges from 0 to 0.005 inch, it will be readily apparent that the present joint will always fall in the region of highest tensile strength. Further, joints made according to the present invention will consistently fall within this region without the necessity for accurate and painstaking accuracy in preparing the surfaces of the joint.

The curve of FIGURE 5 will, of course, vary for different materials, but generally exemplifies the effect of joint thickness and tensile strength and is particularly pertinent in the present case since the present joint is especially suited for the bonding of stainless steel pipe and fittings by a silver braze alloy.

Although the mating surfaces of the present joint are tapered, this tapered joint provides a parallel alignment with the outside surface of the fitting and the inside surface of the pipe. Thus an ultrasonic inspection of the joint can be carried out and will result in the highest possible confidence level of the test results.

It is pointed out that the present joint does not produce any sharp corners or edges and, accordingly, all stress concentration points are avoided.

The tapered mating surfaces permit surface slippage between the mating surfaces of the joint to correct or relieve internal stresses produced by the expansion or contraction of the heated pipe and fitting. As a result, the tendency of the female half of the joint to crack at the outer end of the fitting is reduced. Further, the wedge-shaped cross-section of the cavity between the fitting and pipe provides a greater clearance at the outer end of the joint. Accordingly, greater expansion of the joint can be tolerated without cracking of the outer end of the female half of the joint. This is a significant advantage where dissimilar metals having different coefficients of expansion are being joined by silver brazing. In addition, the present joint provides for additional metal at the entrance end of the female half of the joint just beyond the soldered surfaces in the form of a collar. This collar functions as a heat sink in this critical area and provides greater strength for the fitting to withstand stresses and tension due to expansion and contraction during heating and cooling of the joint. As is well known, this end of the fitting is normally highly vulnerable to cracking during these rapid and severe thermal transients.

In the event it should become necessary to repair a deficiency in a joint formed according to the present invention, the structure of this taper joint facilitates economic joint repair without the necessity of scraping the fitting. Repair of the joint is achieved by unsoldering the joint and then reaming the pipe and fitting with a cleaning tool to expose virgin metal. A prefluxed, tapered silver alloy sleeve is then inserted within the fitting, the pipe and fitting assembled together and heat applied to the fitted pipe and fitting to attain the full bond.

In those special cases where ultimate quality assurance is desired or where internal pipe cleanliness is a mandatory requisite, the present invention enables the tapered surfaces of the pipe and fitting to be tinned individually. Each tinned piece can then be examined either visually or with optical instruments prior to assembly of the joint to ensure that full coverage and proper bonding has been achieved between the silver solder and the base metal of either the pipe or the fitting. The joint is then assembled to estabilsh line contact and heat and flux applied to achieve the desired bond. Under this procedure, the alloy insert functions only to bond two surfaces of an identical alloy since the difficult task of bonding the silver solder to the base metals of the pipe and fitting has already been successfully and positively accomplished.

It is also possible to pretin one tapered surface of the joint and then build up this tinned surface with silver solder to the approximate dimensions of the insert. It would then be possible to assemble such a joint under field conditions since one side of the joint has already been prepared. The resulting joint would have the same maximum quality assurance as the regular tapered joint fabricated as described above, but without having actually used an alloy insert.

In those cases where it is not desirable to use a tapered alloy insert or when the correct insert is not available, the structure of the tapered joint provides an ideal setup for "face feeding" brazing alloy from a brazing rod into the tapered cavity.

It is pointed out that although the above joint has been described for use with silver-base soldering alloys the same advantages will accrue with soft-solder alloys such as lead-in tin base solders.

Thus it can be seen that the present invention has provided a joint between a pipe and a fitting and a method of fabrication of such a joint wherein uniform joints of high strength can be quickly and economically fabricated. The advantages of the present joint can be summarized as follows:

(1) The tapered pipe and fitting ends are simple to machine with a high degree of precision.

(2) The tapered pipe ends and fitting ends are easy to clean.

(3) The insertion of the pipe into the fitting is easily and quickly accomplished.

(4) The physical dimensions of the tapered cavity between the pipe and fitting are fully controlled, easy to achieve, and can be consistently attained.

(5) The cavity between the tapered surfaces is completely filled with alloy and voids in the bond are eliminated by causing the flux, gases and liquified alloy to flow out of the joints but not into the pipe.

(6) High-strength joints are consistently and automatically attained by a thin film of silver alloy whose dimensions are within the region of highest tensile strength for joint thickness.

It is understood that this invention is susceptible to modifications in order to adapt it to different usages and conditions, and accordingly, it is desired to comprehend such modifications within this invention as may fall within the scope of the appended claims.

What is claimed is:

1. A method of joining a pipe and a fitting and comprising the steps of tapering the external surface of a pipe end wtihout affecting the internal diameter thereof, tapering the internal surface of a fitting end to a greater angle with respect to the longitudinal axis of the pipe than the pipe end taper without affecting the outer diameter thereof, positioning a pre-formed tapered sleeve of solder material having a wedge-shaped cross-section between the tapered surfaces to be bonded, assembling the tapered ends of the pipe and fitting with the sleeve therebetween, heating the assembled fitting and pipe ends and the sleeve to the melting temperature of the solder material, and applying an axial force to the assembled pipe and fitting to urge the tapered end of the pipe into line contact with the tapered fitting end when the solder liquifies with the solder material forming fillets at each end of the joint.

2. A method of joining a pipe end fitting as claimed in claim 1 with the axial length of the tapered sleeve being slightly greater than the axial length of the tapered surfaces of the pipe and fitting.

3. A method of joining a pipe and a fitting as claimed in claim 1 with the wedge-shaped cross-section of the sleeve corresponding to the difference in taper angles of the pipe and fitting ends.

4. A method of joining a pipe and a fitting as claimed in claim 1 wherein the taper angles are from 4 degrees to about 20 degrees as measured in an axial plane through the longitudinal axis of the pipe.

5. A method of joining a pipe and a fitting as claimed in claim 1 wherein the angle of the pipe taper is 11 degrees and the angle of the fitting taper is 11¾ degrees, said angles being measured in an axial plane through the longitudinal axis of the pipe.

6. A method of joining pipe and fitting as claimed in claim 1 wherein the thickness of the sleeve of solder material increases from 0.000 inch at the line contact to about 0.005 inch.

7. A method of joining pipe and fitting as claimed in claim 1 wherein the pipe and fitting are of stainless steel and the solder material is a silver brazing alloy.

References Cited

UNITED STATES PATENTS

| 1,986,010 | 1/1935 | O'Laughlin | 29—501 X |
| 2,003,488 | 6/1935 | Hook | 285—287 |
| 2,060,872 | 11/1936 | Kraeuter | 285—287 X |
| 2,174,218 | 9/1939 | Greene | 285—287 |
| 3,032,870 | 5/1962 | Rohrberg et al. | 29—501 X |
| 1,563,269 | 11/1925 | Ferguson | 285—287 |

FOREIGN PATENTS

| 3,332 | 1894 | Great Britain. |
| 651,037 | 3/1951 | Great Britain. |

CHARLIE T. MOON, *Primary Examiner.*

U.S. Cl. X.R.

29—501, 504; 285—287, 332.1